(12) United States Patent
Franzolini et al.

(10) Patent No.: US 7,111,804 B2
(45) Date of Patent: Sep. 26, 2006

(54) DEVICE AND APPARATUS WITH MAGNETIC THREAD-GUIDE FOR WINDING A THREAD ONTO CYLINDRICAL SUPPORTS

(75) Inventors: Laciano Franzolini, Milan (IT); Stefano D'Amicis, Milan (IT)

(73) Assignee: SP. EL. S.r.l., Trezzano sul Naviglio MI (IT)

( * ) Notice: Subject to any disclaimer, the term of this patent is extended or adjusted under 35 U.S.C. 154(b) by 0 days.

(21) Appl. No.: 10/488,283

(22) PCT Filed: Aug. 29, 2002

(86) PCT No.: PCT/EP02/09643

§ 371 (c)(1),
(2), (4) Date: Mar. 2, 2004

(87) PCT Pub. No.: WO03/020624

PCT Pub. Date: Mar. 13, 2003

(65) Prior Publication Data

US 2004/0238678 A1    Dec. 2, 2004

(30) Foreign Application Priority Data

Sep. 3, 2001   (IT) .......................... MI2001A1851

(51) Int. Cl.
*B65H 54/28* (2006.01)

(52) U.S. Cl. ................. 242/481.2; 242/157.1; 310/15

(58) Field of Classification Search ............. 242/476.7, 242/481.2, 486.6, 157.1; 310/15; 104/282, 104/283, 287
See application file for complete search history.

(56) References Cited

U.S. PATENT DOCUMENTS

| | | | | |
|---|---|---|---|---|
| 6,008,613 A | * | 12/1999 | Baader | 318/685 |
| 6,101,952 A | * | 8/2000 | Thornton et al. | 104/282 |
| 6,856,050 B1 | * | 2/2005 | Flechon | 310/12 |

FOREIGN PATENT DOCUMENTS

| | | | |
|---|---|---|---|
| EP | 1 057 765 B1 | | 7/2003 |
| JP | 8-217332 | | 8/1996 |
| JP | 08217332 A | * | 8/1996 |

* cited by examiner

*Primary Examiner*—John Q. Nguyen
*Assistant Examiner*—William E. Dondero
(74) *Attorney, Agent, or Firm*—Dykema Gossett PLLC

(57) ABSTRACT

Thread-guiding device for apparatus for winding a thread onto a support rotatable by associated actuating means, at least one element for receiving and guiding the thread to be wound, the element for receiving and guiding the thread to be wound being integral with a thread guiding device of the magnetic/electromagnetic.

28 Claims, 3 Drawing Sheets

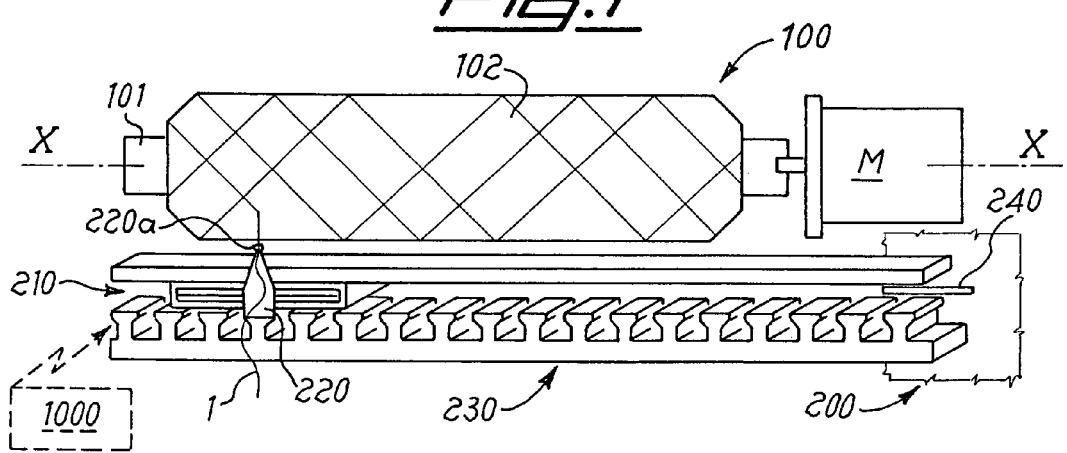
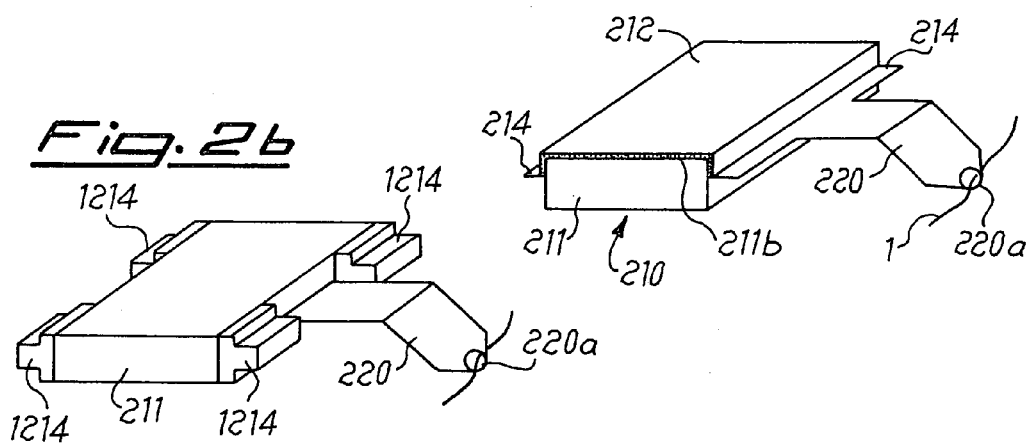
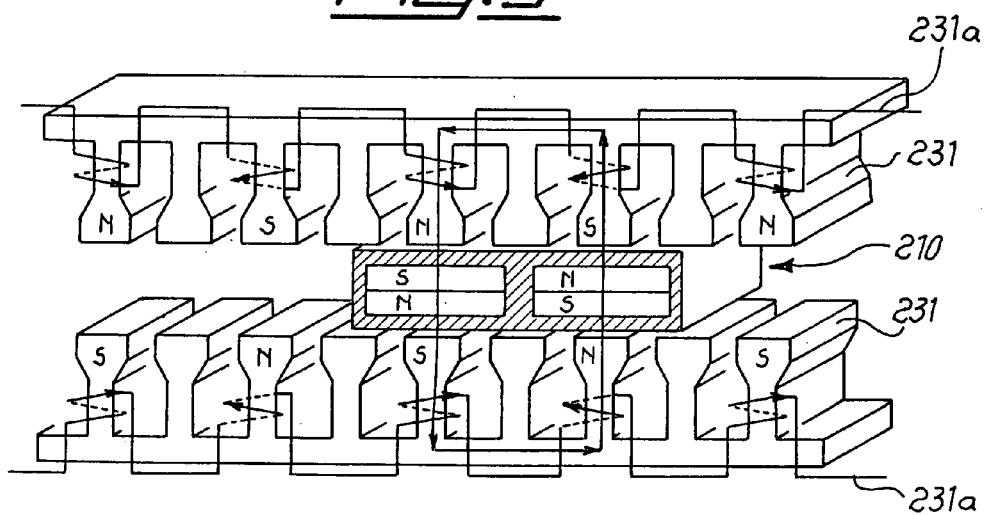

DEVICE AND APPARATUS WITH MAGNETIC THREAD-GUIDE FOR WINDING A THREAD ONTO CYLINDRICAL SUPPORTS

BACKGROUND OF THE INVENTION

The present invention relates to a device and an associated apparatus for controlling the winding of threads, yarns and the like on rotating supports, for example, for forming reels in the textile industry. It is known that in the textile industry every process which is performed using a thread results in the need to store the thread itself so that it is available in the most convenient form for the subsequent operations. One of the most common forms used for said storage operation consists in a so-called reel or a cylindrical element onto which the thread is wound so as to produce a spool (reel) which must have well-defined characteristics—such as the diameter, weight, form, unwinding precision and speed. These parameters define the degree of suitability of a certain type of reel for the subsequent processing operation which may require a high unwinding speed, or a winding tension which is as small as possible, or a uniform density or high volume.

It is also known that such characteristics are essentially determined by the procedures and the conditions used for winding the reel, which winding operation, however, must be performed as rapidly and precisely as possible.

Such winding operation is basically performed by fastening one end of a thread to a cylinder supporting the reel and causing rotation of the cylinder itself by means of a controlled motor; the thread is at the same time inserted into a guide element (thread guide) actuated so as to perform an alternating rectilinear movement with a trajectory parallel to the axis of the cylinder.

Winding of the thread onto the reel gives rise to two main problems relating to control, namely:

the need to minimise the time for reversal of the movement of the thread guide so as to obtain the maximum possible winding speed; and the need to ensure the maximum precision of the thread reversal point, namely the point where the thread terminates an outward winding cycle and starts the return winding cycle; control over the reversal position is of crucial importance for preventing dropping of the thread from the reel or, on the other hand, overlaying of the thread (beading)—a direct cause of breakage of the thread and/or incorrect unwinding of the reel during the subsequent processing operations.

Both the abovementioned control-related problems are mainly influenced by the mechanical devices for driving and transmission of the movement from the actuating motor(s) to the thread-guide device: these mechanical devices introduce in fact a high degree of imprecision due to manufacturing tolerances, wear of the said devices over time (with consequent need for maintenance), and the fact that one of these elements usually consists of a drive belt which is inevitably subject to a certain degree of play which rapidly alters the mechanical characteristics thereof, resulting in an unpredictable degree of imprecision. In addition to this, the mechanical components introduce a high inertia which contrasts with the need for a high dynamic component during reversal of the movement of the thread guide.

All these factors therefore result in the need for continuous re-calibration of the apparatus in order to compensate for the operational defects associated therewith, or alternatively a thread storage quality which is below the expected standard must be accepted.

The prior art according to the preamble of claim 1 is disclosed in JP-8-217332 into which a magnet with poles aligned along the direction of displacement is associated to a guide member of the thread.

SUMMARY OF THE INVENTION

The technical problem which is posed, therefore, is that of providing a device and an apparatus for controlling devices for guiding and laying threads, yarns and the like to be wound onto rotating supports, for example cylinders for forming a reel, which are able to minimise the time for reversal of the direction of the yarn-guiding movement, overcoming the abovementioned problems which are determined by the presence of mechanical devices for driving and transmission of the thread-guide movement.

Within the context of this problem a further requirement is that the device and the associated apparatus should be easy and inexpensive to implement and able to be applied to apparatus of the known type without the need for special and costly adaptation. These technical problems are solved according to the present invention by a thread-guiding device for apparatus for winding a thread onto a support made to rotate by associated actuating means according to the characteristic of claim 1.

The invention also relates to an apparatus for winding a thread onto a support made to rotate by associated actuating means according to the characteristic of claim 4.

Further details may be obtained from the following description of a non-limiting example of embodiment of the invention provided with reference to the accompanying plates of drawings in which:

BRIEF DESCRIPTION OF THE DRAWINGS

FIG. 1 shows a schematic, partially sectioned view of a thread-guiding apparatus according to the present invention;

FIGS. 2*a*, 2*b* show perspective views of respective first examples of an embodiment of a thread-guiding device incorporated in a magnetic element according to the present invention;

FIG. 5 shows a schematic cross-section, similar to that of FIG. 3*a*, of a second example of an embodiment of the apparatus according to the present invention.

DETAILED DESCRIPTION OF THE INVENTION

Figure 3A:
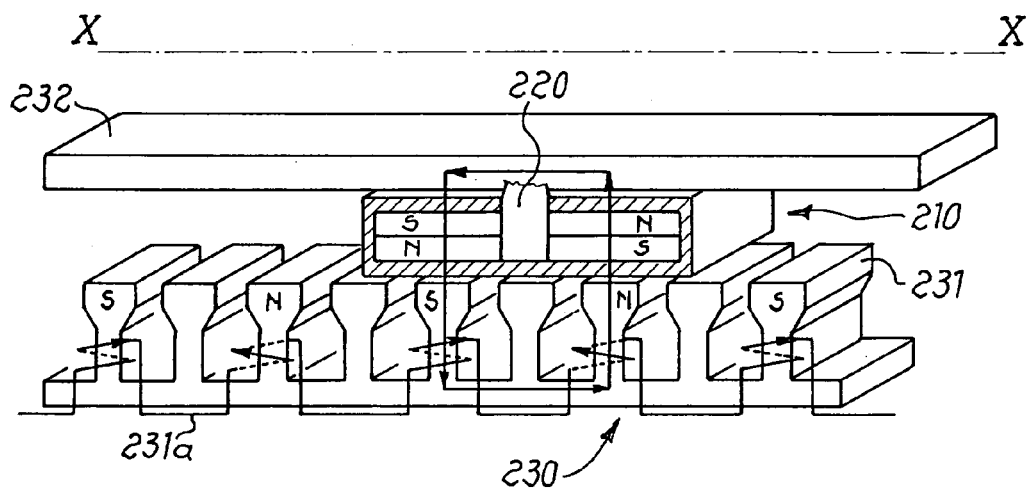
FIGS. 3*a*, 3*b* show schematic cross-sectional views, similar to that of FIG. 1, in the zero torque and maximum torque conditions, respectively.

As illustrated in FIG. 1, the apparatus comprises a reel assembly 100—comprising a motor M which causes rotation of a cylinder 101 with a longitudinal axis X—X, onto which the thread 1 is wound so as to form a reel 102, and a thread-guiding apparatus 200 which comprises:

a thread-guiding device 210 provided with a pointer 220 through which the thread 1 to be wound onto the reel 102 passes;

means 230 able to produce the movement of the thread-guiding device 210; and means 240 for guiding the device during the movement thereof.

In general and according to the known art, the combination of the rotational movement of the cylinder and the alternating rectilinear movement of the thread guide which moves between two end points called "reversal points" results in winding of the thread onto the cylinder and the formation of the reel.

In greater detail and as illustrated in FIG. 2a, said thread-guiding device 210 consists of a base-piece 211 formed with permanent magnets assembled in a suitable configuration of the polarities, North (N) and South (S).

The base-piece 211 has, fixed to it, by means of an adhesive 211b or other conventional technology, a strip 212 made of suitable non-magnetic material so as to form a projecting pointer 220 which contains the eyelet 220a through which the thread 1 passes.

In a preferred embodiment (FIG. 2a), the strip is folded so as to form also two tongues 214 which are substantially continuous and project symmetrically outwards on two opposite sides of the base-piece 211 and are designed to form runners for sliding and guiding the device during its movement inside the apparatus which is described more fully below.

In a further embodiment (FIG. 2b) of the thread-guiding device 210, it is envisaged that the runners are formed by means of discontinuous projections 1214 provided for example at the ends of each side of the device.

Figure 3B:
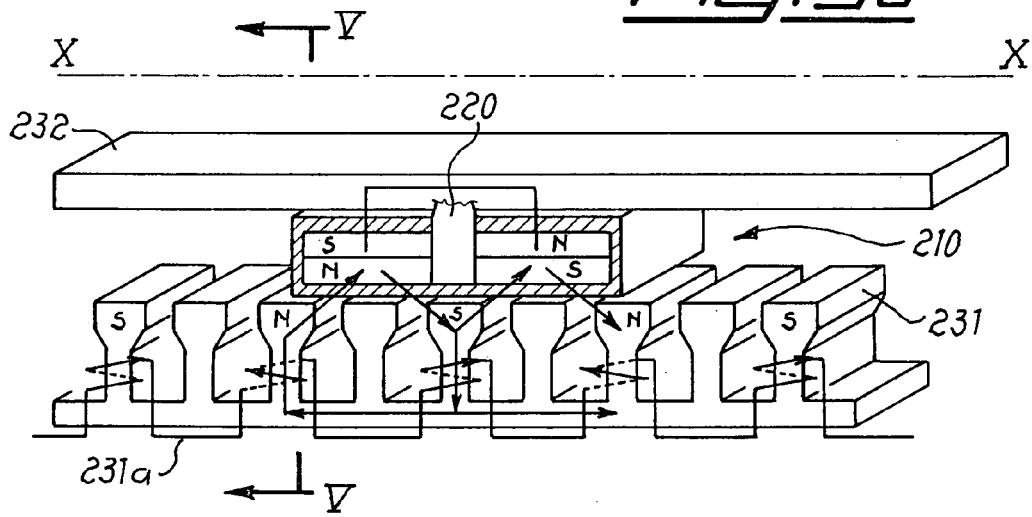

FIGS. 3a and 3b show in greater detail a first embodiment of the thread-guiding apparatus 200 according to the present invention.

The apparatus is essentially formed by a fixed part 230 comprising pole shoes 231 arranged alongside each other in a longitudinal direction parallel to the longitudinal direction X—X of the reel 102; each pole shoe 231 forms the core of an electrical winding 231a through which current is passed so as to produce a magnetic field with pairs of poles of opposite polarity, North (N) and South (S).

FIGS. 3a, 3b show a hypothetical asymmetrical magnetic circuit with two phases, only one of which has been shown in the figures.

The fixed magnetic circuit 230 also comprises a magnetic bar 232 extending in the longitudinal direction on the opposite side to that of the pole shoes 231, relative to the yarn guide 210, 1210 and able to allow closing of the flux lines of the magnetic field generated by the winding 1211a.

The circuit is asymmetrical in that the excitation which produces the fixed magnetic field occurs on one side only, relative to the thread-guiding device 210. Said fixed part 230 also comprises two longitudinal rails 240, inside which the runners 214,1214 of the yarn-guiding device 210 slide in order to keep the latter centred and aligned with respect to the pole shoes 231 and the bar 232 so as to form the necessary air-gap between the associated base-piece 211, 1211 and the pole shoes 231, the bar 232 being such that the magnetic field of the fixed part 230 may interact with the magnetic field of the thread-guiding element, being closed on the bar 232, and produce the displacement in the direction parallel to the axis X—X of the reel and in either sense thereof.

Figure 4:
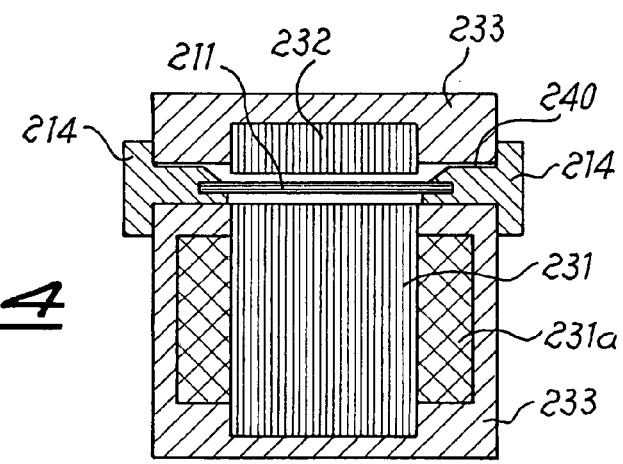
FIG. 4 shows a schematic cross-section along the plane indicated by the line V—V in FIG. 3*b*.

As illustrated, the flux lines of the magnetic field indicate in FIG. 3a zero torque conditions (angular phase-displacement of 0°) and in FIG. 3b maximum torque conditions (angular phase-displacement equal to 90°). The cross-section in FIG. 4 also shows a lining 233, for example comprised of resin, surrounding the various parts of the apparatus; the lining may be applied at the time of manufacture of the various component parts; said resin parts may then be shaped so as to form the said guides 240 and the runners 214.

FIG. 5 moreover shows an apparatus with a fixed magnetic field of the symmetrical type, namely with excitation on both sides of the thread-guiding device 210; in this case and as can be seen from the flux lines, the two fields are combined, resulting in improved functional characteristics of the assembly.

In order to be able to control the movement of the thread-guiding device and therefore the winding characteristics of the reel, it is envisaged that the control and actuating devices schematically denoted by 1000 in FIG. 1 are able to control the direction and the current intensity of the windings so as to determine the direction and the strength of the magnetic excitation field which, interacting with the magnetic field of the thread guide 210, determines the direction and the speed of displacement of the latter.

The control relates essentially to the precision with which the thread guide centres the two opposite and programmed points for reversal of the movement, the uniformity of the movement and the speed with which this reversal may be obtained.

According to the invention it is envisaged that the control may essentially be achieved by means of two different functional arrangements of the so-called open-loop and closed-loop type.

In the case of open-loop control, only the aforementioned parameters relating to direction and intensity of the vectorial current are controlled, assuming that the reversal points are in any case centred with sufficient precision.

In the case of close-loop control, in addition to controlling the said directional and current intensity parameters, the actual position of the yarn guide is also controlled continuously by means of a sensor and, on the basis of the information sent from the sensor itself to the control system 1000, the control parameters are varied so as to allow centring of the reversal points with a high degree of precision and speed.

This control method is for example known from EP 1,057,765 commonly owned herewith. It is therefore clear how the apparatus according to the present invention allows winding of the thread onto the rotating support to be performed using a small number of components devoid of mechanical drive systems, resulting in a reduction in the inertial masses and an increase in the working speed with less wear and greater reliability.

Figure 6A:
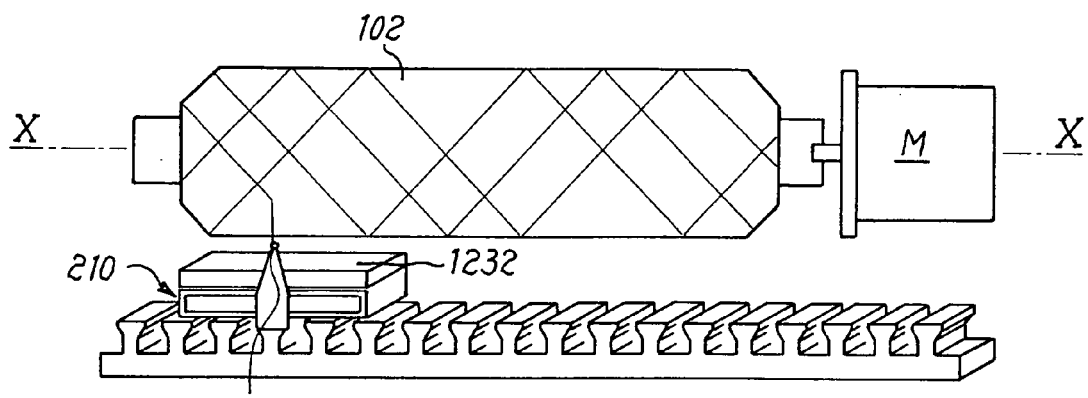
FIGS. 6*a*–6*c* show schematic views, similar to the preceding views, of a further example of an embodiment of the apparatus according to the invention.
Figure 6B:
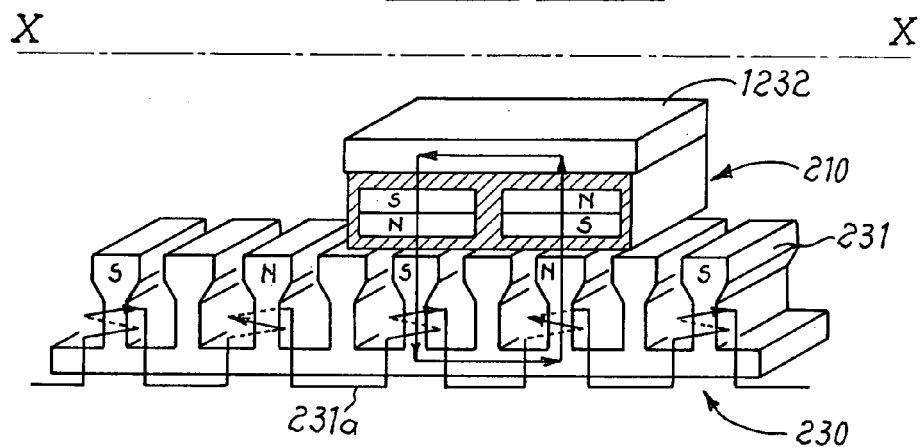
Figure 6C:
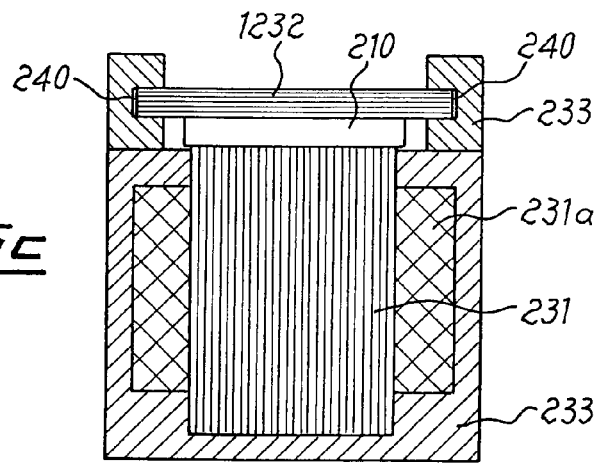

Many variations may be introduced during the practical realization of the various component parts of the apparatus according to the invention: in particular, FIGS. 6a to 6c show a further embodiment of the apparatus according to the invention: in this case the magnetic bar 1232 for closing the flux lines of the magnetic excitation field has a longitudinal dimension substantially equal to that of the magnetic element 210 which supports the thread guide and is integral with the latter so as to be able to displaced together therewith.

In this case also, the resin linings 233 may be shaped so as to form the guides 240.

Although illustrated only with regard to the asymmetrical configuration, this embodiment may also be used for the symmetrical configuration; in this case the bar 1232 will be arranged between two magnets forming the thread guide.

What is claimed is:

1. Apparatus for winding a thread onto a support rotatable by associated actuating means, comprising at least one element for receiving and guiding the thread to be wound, integral with magnetic support means, said apparatus also comprising means for generating a fixed magnetic field able to interact with the magnetic field of the thread-guiding device so as to produce movement thereof in a direction parallel to a longitudinal axis of the magnetic support wherein opposed N/S poles of the support means are oriented along a direction orthogonal to displacement direction of the magnetic support means, wherein said means for generating a fixed magnetic field comprises asymmetrical pole shoes around which an electrical conductor is wound.

2. Apparatus according to claim 1, wherein said support means of the thread-guiding device comprise permanent magnets.

3. Apparatus according to claim 1, wherein said support means comprise runners for sliding of the device during movement thereof.

4. Apparatus according to claim 1, wherein said means for generating the fixed magnetic field are arranged so as to extend in a linear manner parallel to a longitudinal axis of the thread winding cylinder.

5. Apparatus according to claim 1, further comprising means for closing the flux lines of the magnetic excitation field, arranged on the opposite side to the latter, relative to the thread guide.

6. Apparatus according to claim 5, wherein said means for closing the flux lines are fixed.

7. Apparatus according to claim 5, wherein said means for closing the flux lines are integral with the thread-guiding device and movable together therewith.

8. Apparatus according to claim 1, further comprising fixed support and guide means able to co-operate with corresponding runners of the thread-guiding device.

9. Apparatus according to claim 8, wherein said fixed support and guide means are of the linear type and arranged parallel to a longitudinal direction of the cylinder for winding the thread.

10. Apparatus for winding a thread onto a support rotatable by associated actuating means, comprising:
at least one element for receiving and guiding the thread to be wound, integral with magnetic support means;
means for generating a fixed magnetic excitation field having flux lines able to interact with the magnetic field of the thread-guiding device so as to produce movement thereof in a direction parallel to a longitudinal axis of the magnetic support wherein opposed N/S poles of the support means are oriented along a direction orthogonal to displacement direction of the magnetic support means;
means integral with the thread-guiding device and movable together therewith for closing flux lines of the magnetic excitation field, arranged on the opposite side to the latter, relative to the thread guide.

11. Apparatus for winding a thread onto a support rotatable around a longitudinal axis, comprising: at least one element, for receiving and guiding the thread to be wound, including integral support means comprising opposite magnetic poles movable in a displacement direction parallel to the longitudinal axis, said apparatus also comprising means for generating a fixed magnetic field for interacting with the magnetic field of the support means for producing the movement thereof in a direction parallel to the longitudinal axis of the support, wherein the opposed poles of the support means are oriented to establish a magnetic flux along a direction orthogonal to the displacement direction.

12. Apparatus according to claim 11, wherein said support means comprises permanent magnets.

13. Apparatus according to claim 11, wherein said support means comprises runners for sliding the device during the movement thereof.

14. Apparatus according to claim 11, wherein said means for generating the fixed magnetic field comprise pole shoes and an electrical conductor wound about said pole shoes.

15. Apparatus according to claim 14, wherein said means for generating the fixed magnetic field is arranged so as to extend in a linear manner parallel to the longitudinal axis of the thread winding cylinder.

16. Apparatus according to claim 14, wherein said means for generating the fixed magnetic field is asymmetrical.

17. Apparatus according to claim 14, wherein said means for generating the fixed magnetic field is symmetrical.

18. Apparatus according to claim 14, further comprising means for closing flux lines of the magnetic field, arranged on the opposite side of the latter, relative to the thread guide.

19. Apparatus according to claim 18, wherein said means for closing the flux lines is fixed.

20. Apparatus according to claim 18, wherein said means for closing the flux lines is integral with the thread-guiding device and movable together therewith.

21. Apparatus according to claim 14, further comprising fixed support and guide means for co-operating with the corresponding runners of the support means.

22. Apparatus according to claim 21, wherein said fixed support and guide means are linear and arranged parallel to the longitudinal direction of the cylinder for winding the thread.

23. A method for moving a support means having magnetic poles inside an apparatus for winding a thread onto a support rotatable around a longitudinal axis, said winding apparatus having a fixed part and a displaceable guiding device comprising the steps of:
orienting the magnetic poles of the support means in a direction orthogonal to a displacement direction of the guiding device;
constraining the support means with respect to a movable magnetic means;
arranging said movable magnetic means close to a fixed magnetic field integral with the fixed part of the apparatus;
excitating said fixed magnetic field in order to establish flux lines of the fixed magnetic field crossing the magnetic poles of the support means along a direction orthogonal to the direction of displacement of the guiding device so as to produce the movement of the thread-guiding device along said displacement direction between two end reversal points.

24. Method according to claim 23, wherein movement of the support means between said two end reversal points comprises alternating rectilinear movement.

25. Method according to claim 23, wherein the magnetic field of the movable element is generated by permanent magnets.

26. Method according to claim 23, wherein the fixed magnetic field is generated by electrical windings supplied with vectorial currents.

27. Method according to claim 23, further comprising the step of open-loop controlling the movement of the support means.

28. Method according to claim 23, further comprising the step of closed-looping controlling the movement of the support means.

* * * * *